(12) United States Patent
Carter et al.

(10) Patent No.: US 10,789,608 B1
(45) Date of Patent: Sep. 29, 2020

(54) DIGITAL ADVERTISING CONTROL MODULE

(71) Applicant: BlackArrow, San Jose, CA (US)

(72) Inventors: Leslie M Carter, San Jose, CA (US); Shannon Brown, San Jose, CA (US)

(73) Assignee: Cadent Tech, Inc, San Jose, CA (US)

( * ) Notice: Subject to any disclaimer, the term of this patent is extended or adjusted under 35 U.S.C. 154(b) by 53 days.

(21) Appl. No.: 14/105,131

(22) Filed: Dec. 12, 2013

Related U.S. Application Data

(60) Provisional application No. 61/736,506, filed on Dec. 12, 2012.

(51) Int. Cl.
*G06Q 30/00* (2012.01)
*G06Q 30/02* (2012.01)

(52) U.S. Cl.
CPC ................ *G06Q 30/0241* (2013.01)

(58) Field of Classification Search
CPC . H04L 63/0227; H04L 63/102; G06F 21/552; G06Q 30/0241
USPC ............ 726/1; 705/14.4, 14.73, 14.49
See application file for complete search history.

(56) References Cited

U.S. PATENT DOCUMENTS

| | | | |
|---|---|---|---|
| 2011/0258049 A1* | 10/2011 | Ramer | G06F 17/30867 705/14.66 |
| 2013/0208076 A1* | 8/2013 | Garcia | H04M 3/42042 348/14.05 |
| 2014/0143825 A1* | 5/2014 | Behrendt | G06F 21/552 726/1 |

* cited by examiner

*Primary Examiner* — Sun M Li
(74) *Attorney, Agent, or Firm* — Rowan TELS LLC

(57) ABSTRACT

A component in an advanced advertising system includes logic to arrange storage in a machine memory according to a data policy enforcement hierarchy defined in a digital file (policy file); logic to read the policy file from machine memory; logic to apply an arrangement of the policy file read from machine memory to control modifications to content of a received digital message requesting ad placement data; and logic to modify the received digital message according to the policy file.

4 Claims, 12 Drawing Sheets

DIGITAL ADVERTISING CONTROL MODULE

PRIORITY

This application claims priority under 35 U.S.C 119 to U.S. application Ser. No. 61/736,506, filed on Dec. 12, 2012, which is incorporated herein by reference in its entirety.

BACKGROUND

Advanced digital advertising systems may conform to design and operational specifications such as DVS 130 (Digital Program Insertion—Advanced Advertising Interfaces) by the SCTE (Society of Cable Telecommunication Engineers). DVS 130 defines a system framework to select ads to combine into digital content for targeted viewers, whether that content is linear (linear streaming), stored (store and forward), or switched (switched streaming). Different mechanisms of ad delivery are provided, such as ad insertion, ad replacement, pause ads, and telescoping ads. Conventional DVS 130 compliant systems may benefit from novel data access controls between components owned and controlled by different entities.

Applications of advanced digital advertising systems include ATS, CATV, DTV, Digital Video, ITV, IP Video, IPTV, VOD, and video streaming.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

Overview

A system is described herein which provides for novel data access control between components owned and controlled by different entities in an advanced advertising system. The system provides for flexible, extensible control over data access on a per-component basis (logic blocks having defined functionality and explicit interfaces for accessing that functionality). The level of control may be as refined as a particular data field or value, or as general as a class or classes of data.

Figure 1:
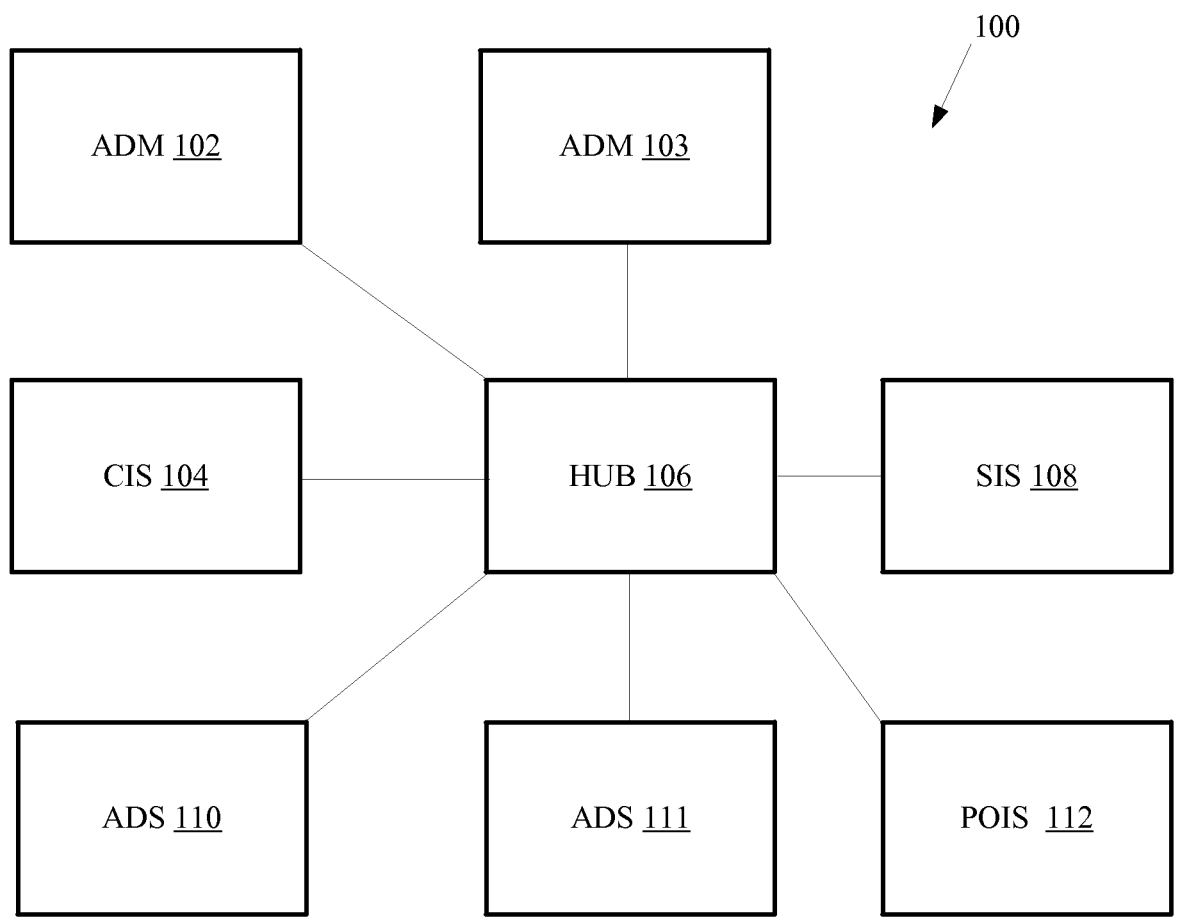
FIG. 1 is an example architecture diagram of a portion of a digital advertising system.

FIG. 1 illustrates an embodiment of an advanced digital advertising system 100. Functions carried out by the system include ad opportunity identification, ad selection, and ad placement. These functions are allocated among various logic blocks, which may be owned/controlled by different entities. Communication among the logic blocks may be carried out by signals over a data network (WAN, LAN, and combinations thereof) from different physical locations. These signals may be organized into messages that convey actions that one logic block should undertake on behalf of another, and data values exchanged between logic blocks.

The logic blocks are labeled according to categories of functions they carry out. The blocks labeled ADS 110, 111 are ad decision (i.e., ad selection) components. The ADS components 110, 111 define rules and implement functions to select ads to be combined with program content and to define how the ads and program content are combined. Decisions may be specific (e.g., specific to a date and time) or they may be made based on a set of conditions and parameters (e.g., geographic zones and subscriber profile information).

The blocks labeled ADM 102, 103 are ad management components. The ADM components 102, 103 define rules and implement functions to coordinate the insertion of advertising media into other content (e.g., programs). According to DVS 130, ADS components 110, 111 register to cooperate with one or more ADM components 102, 103. The ADS components 110, 111 select ads and specify how to combine them with other content, and the ADM components 102, 103 control the actual combining of the ads with the other content.

The blocks labeled CIS 104 are content information components. The CIS components 104 define rules and implement functions to identify and manage descriptive data (metadata) for content (e.g., programs) and advertising. The CIS components 104 provide search, discovery, and availability alerts for content and the ads to combine with the content.

The blocks labeled POIS 112 are placement opportunity information components. The POIS components 112 define rules and implement functions to identify and describe ad placement opportunities. The POIS 112 defines which platforms are available for particular ad media, ownership rights associated with ad placement opportunities, and ad placement policies. Ad placement opportunities are specific to specific content and may also be specific to the communication network for the content, the geographic location(s) where the content is distributed, and many other factors.

The blocks labeled SIS 108 are subscriber information components. The SIS components 108 define rules and implement functions to store, process, and access subscriber information to apply to the ad selection process. The SIS 108 may be employed for selection and placement of ads based on subscriber media consumption behavior. The SIS 108 stores and controls access to personal information of media consumers (e.g., cable television subscribers). Thus conventional SIS components 108 control and limit access to the information they store in order to provide for the privacy of media consumer's personal data.

One or more ADS component 110, 111 may register with one or more CIS component 104 to search for content and receive alerts when specific types of content are available for placing ads. One or more POIS components 112 may be engaged by other components to identify when advertising content is available. One or more SIS components 108 may be engaged by other components to obtain information related to subscriber activities (preferences or viewing habits).

The hub component coordinates communication between all of the system components. The hub may be stateless relative to the other components, or it may maintain an internal state independent of the state of the other components.

Figure 2:
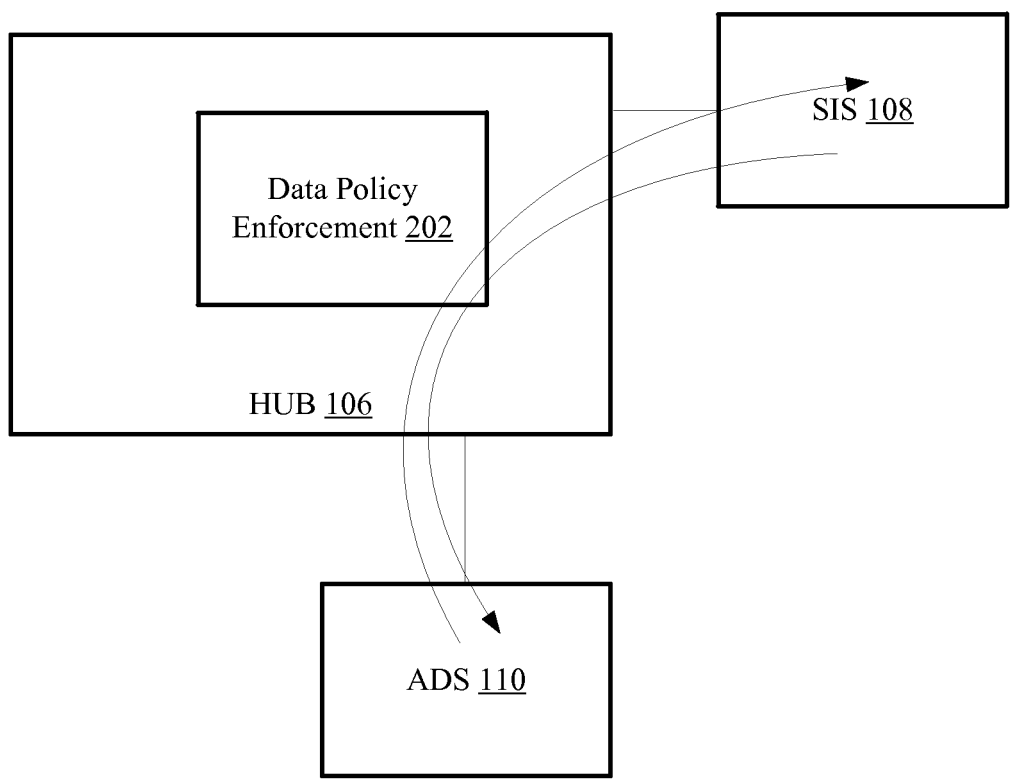
FIG. 2-FIG. 8 illustrate different embodiments of an advanced advertising system including a hub component and a data policy enforcement component. Depending on the implementation, the data policy enforcement component may be part of the hub component, or external to the hub component, or may be external to but controlled by the external hub component, or external to and autonomous from the hub component.

FIG. 2 illustrates an embodiment of a hub component comprising internal data access controls. The data access controls may be defined as policies using a hierarchy of tags as shown by the example in Listing 1 (this is only one example for descriptive purposes). The policies defined in the tag hierarchy may control data access by one or more ADS 110, ADM 102, or POIS 112 component. Data access request messages are routed through the hub component from a requesting component to a responding component. A policy enforcement component within the hub applies the access policies defined by the hierarchy to the request, the response to the request, or both.

Figure 3:
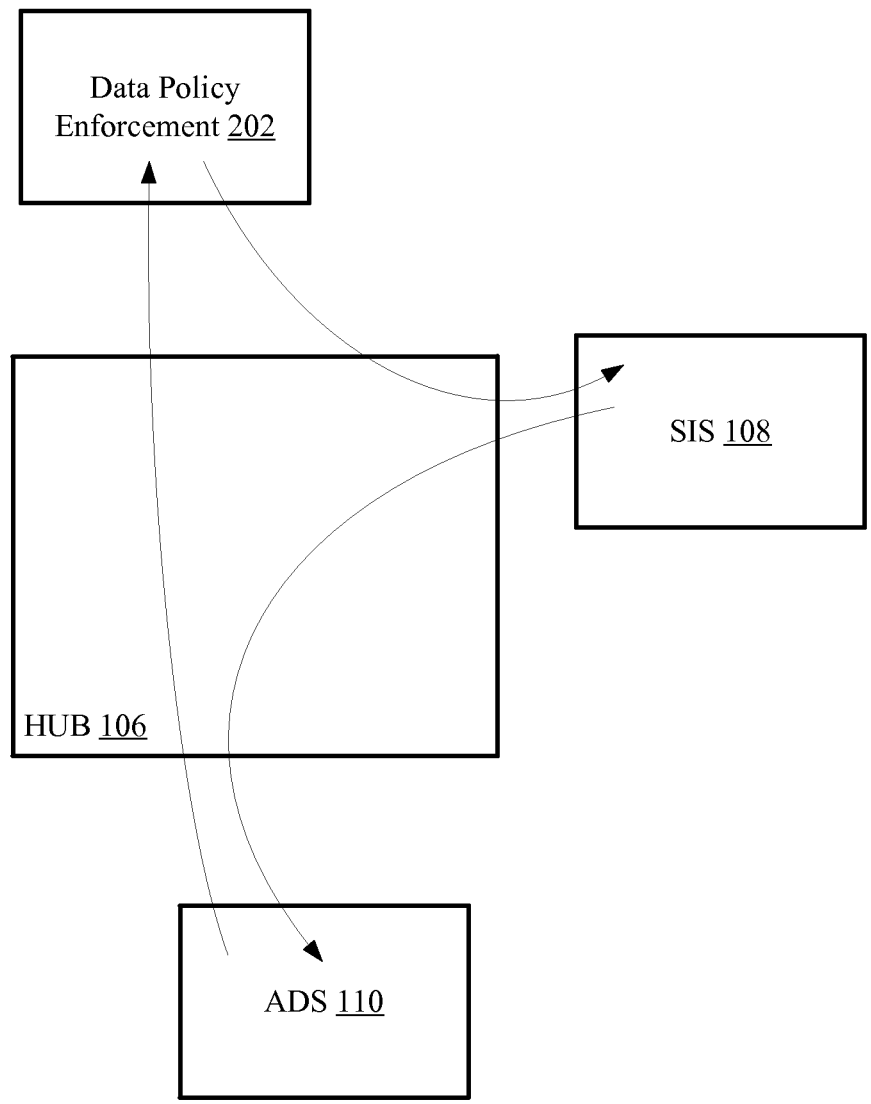

FIG. 3 illustrates an embodiment of a system comprising a hub component and external data access controls. The data access controls may be defined as policies using a hierarchy of tags as shown by the example in Listing 1 (this is only one example for descriptive purposes). The policies defined in the tag hierarchy may control data access by one or more ADS 110, ADM 102, or POIS 112 component. Data access request messages are routed through the hub component from a requesting component to a responding component. The hub utilizes messages to and from an external policy enforcement component to subject the request, the response to the request, or both to the access policies defined by the hierarchy.

Figure 4:
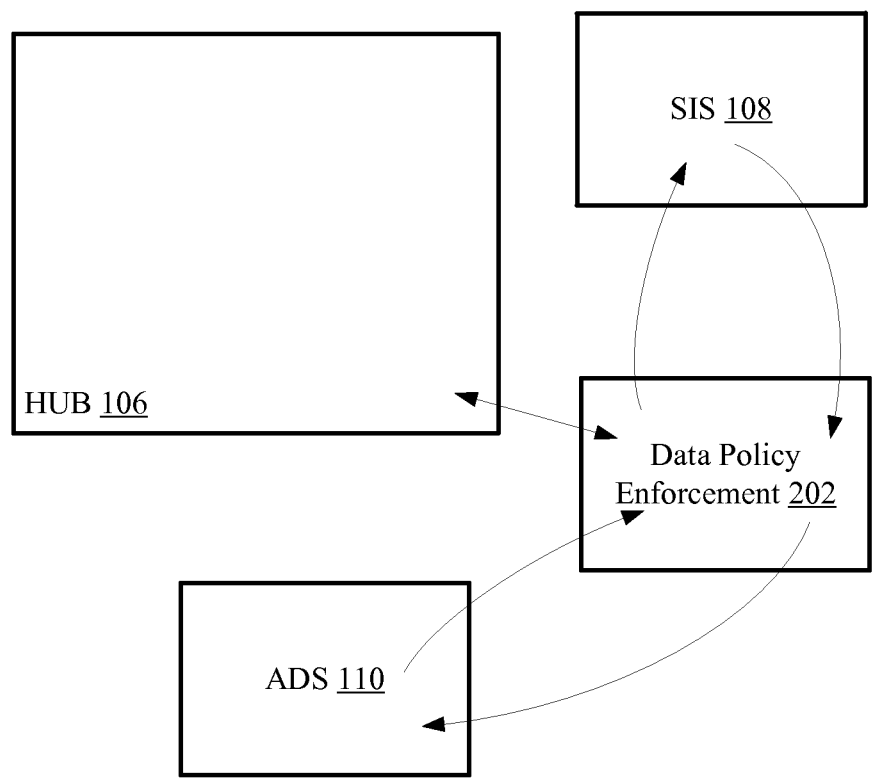
Figure 5:
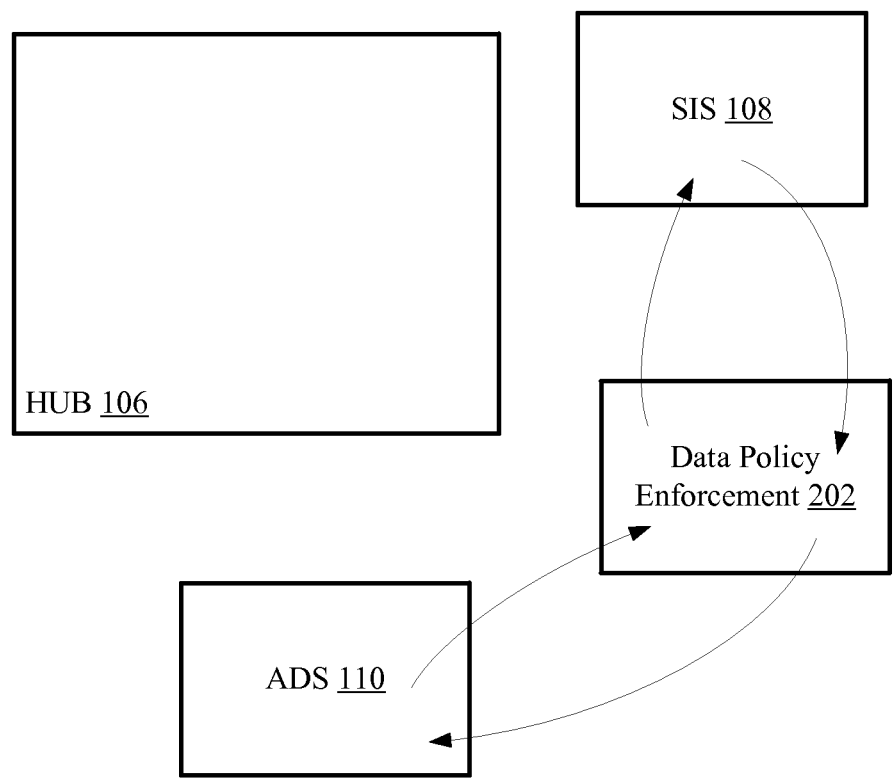
Figure 6:
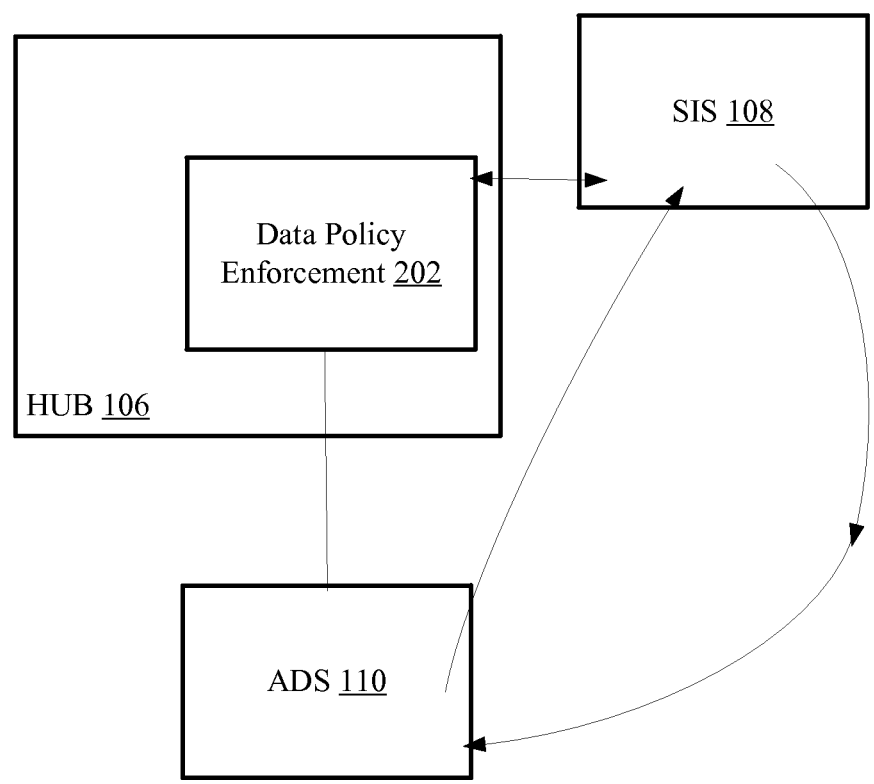
Figure 7:
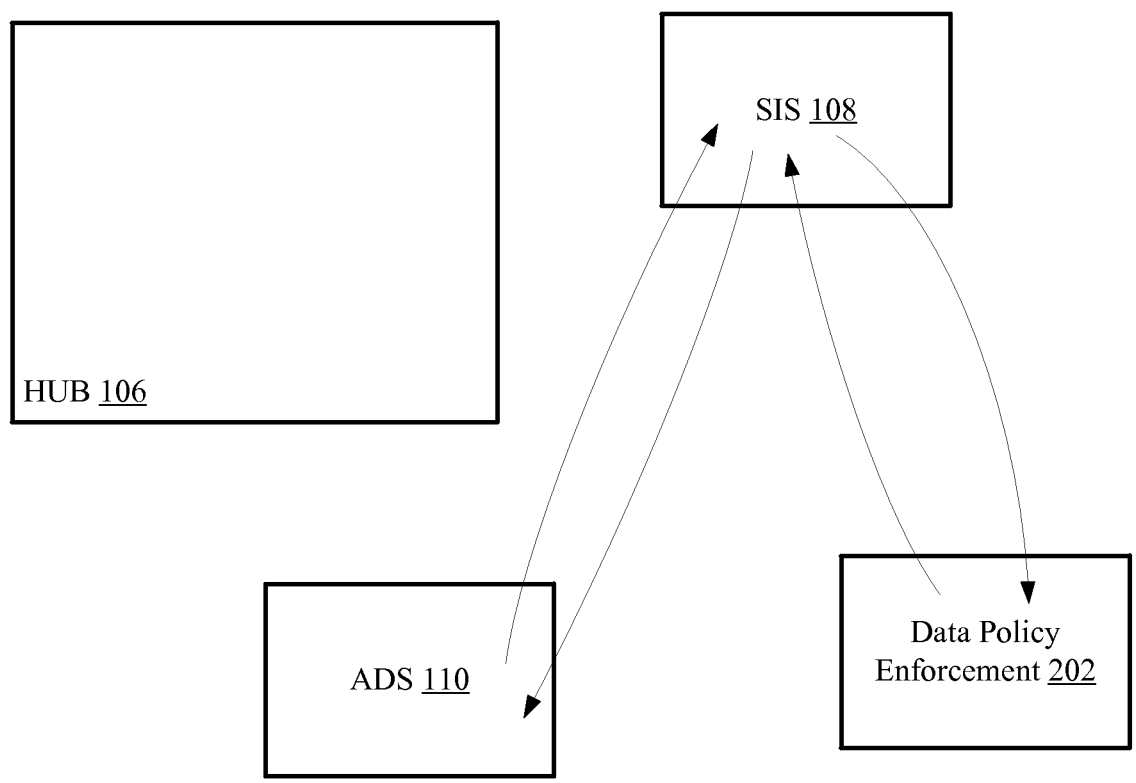
Figure 8:
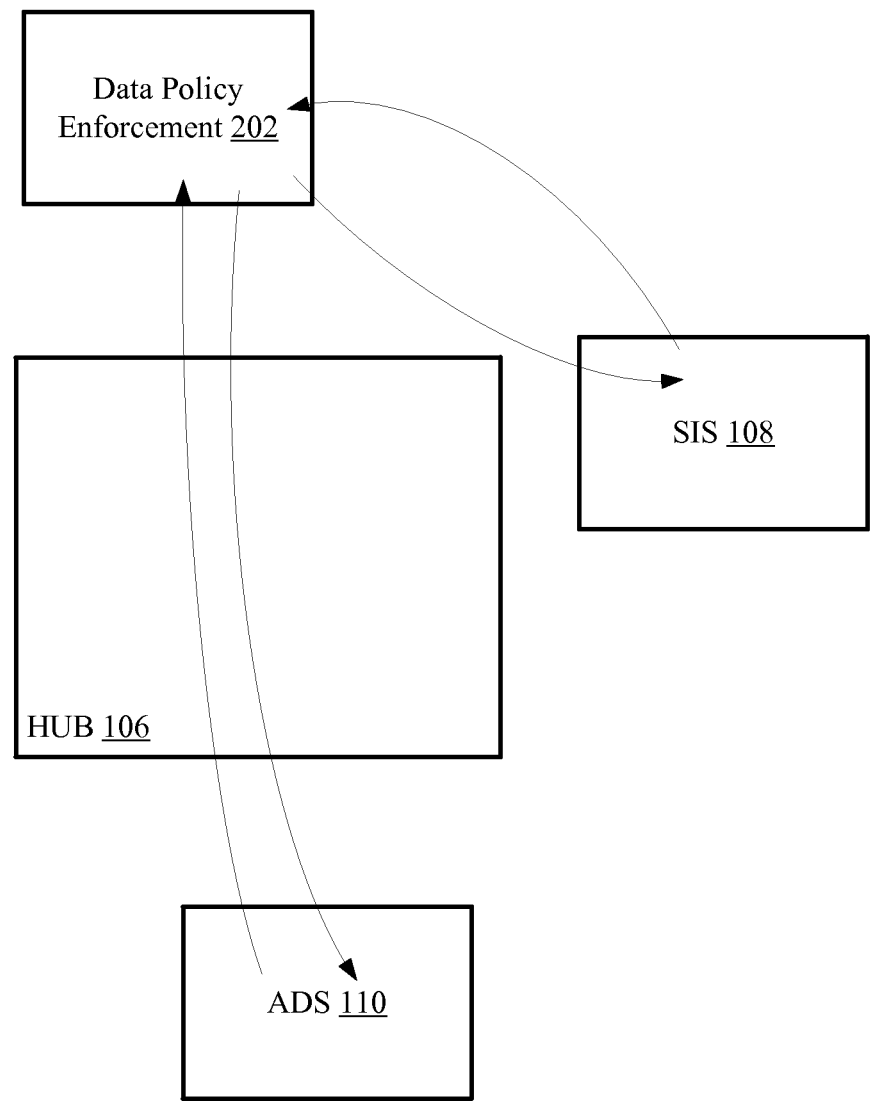

An ADM 102, ADS 110, or POIS 112 component may in some systems send requests to a SIS 108, CIS 104, or POIS 112 component without communicating the messages directly to an intervening hub component. An example of such a system is illustrated in FIG. 4. In systems of this type, the hub component may control the policy enforcement component, or the policy enforcement component may operate independently of the hub component to process data request messages. In the former case, the hub registers with the policy enforcement component to receive notifications when other components make data access requests (e.g., the hub registers for notifications for requests for particular types of data, or for requests from particular other components, or for requests in general). The hub utilizes messages to and from the external policy enforcement component to subject the request, the response to the request, or both to the access policies defined by the hierarchy.

Various embodiments for the interaction of system components, and the arrangement of policy enforcement logic with respect to hub logic, are illustrated in FIG. 5-FIG. 8. Depending on the implementation, the data policy enforcement component may be part of the hub component, or external to the hub component, or may be external to but controlled by the hub component, or external to and autonomous from the hub component.

A policy enforcement module in an advanced advertising system may thus include logic to arrange a machine memory according to a data policy enforcement hierarchy defined in a digital file (policy file). The policy file will be read from a machine memory, typically a hard drive or other non-volatile memory device (e.g., flash drive) and an arrangement of the policy file applied to control modifications to content of a received digital message requesting ad placement data or responding to an ad placement request. The received digital message is modified by the policy enforcement module as follows: (a) if the arrangement of the policy file includes a distinct section on target code addition, adding to the received digital message, or to a message derived from the received digital message, first target codes specified by the section on target code addition; (b) if the arrangement of the policy file includes a distinct section on target code removal, removing from the received digital message, or omitting from a message derived from the received digital message, second target codes specified by the section on target code removal; (c) if the arrangement of the policy file includes a distinct section on target code replacement, replacing in the received digital message, or including in a message derived from the received digital message, target code replacements specified by the section on target code replacement; and (d) if the arrangement of the policy file includes a distinct section on target code regular expressions, applying the regular expressions to target codes in the received digital message.

Listing 1 (to follow) exemplifies a data hierarchy as represented in a policy file, which may define behavior of a data policy enforcement component.

Listing 1
```
<?xml version="1.0" encoding="UTF-8" ?>
<messageHandler>
    <preHandler>
```

```xml
<handler name="add-target-codes-handler">
    <targetCode>
        <name>msoCustomer</name>
        <value>true</value>
    </targetCode>
    <targetCode>
        <name>country</name>
        <value>usa</value>
    </targetCode>
</handler>
<handler name="regex-target-codes-handler">
    <targetCode>
        <name>age</name>
        <value>[0-9]{2}</value>
    </targetCode>
</handler>
<handler name="remove-target-codes-handler">
    <targetCode>
        <name>macAddress</name>
    </targetCode>
    <targetCode>
        <name>income</name>
    </targetCode>
</handler>
<handler name="replace-target-codes-handler">
    <targetCode>
        <name>25 k</name>
        <value>250000</value>
    </targetCode>
    <targetCode>
        <name>Baseball</name>
        <value>baseball</value>
    </targetCode>
</handler>
</preHandler>
</messageHandler>
```

Figure 10:
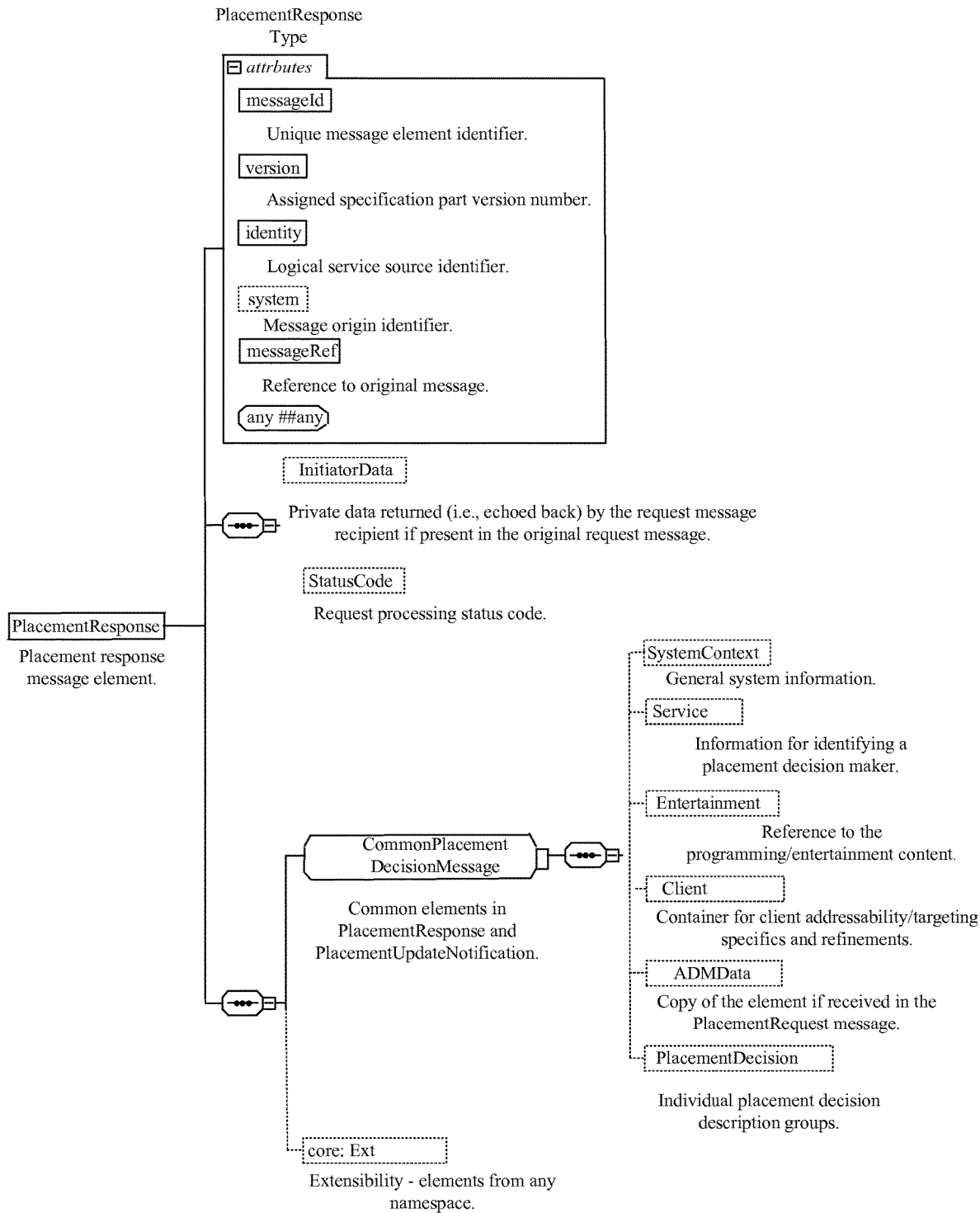
FIG. 10 illustrates an SCTE-130-3 PlacementResponse message that may invoke the data policy enforcement component.

Listing 1 is an example data organization that may alter a machine memory to influence privacy enforcement logic in an advanced advertising system. This example organization is implemented using Extensible Markup Language (XML). The data organization is divided into sections. In practice the data organization would typically include multiple entries in each section. The example data organization defines a message handler including and within the <messageHandler> tag. Rules defined in the message handler are applied prior to sending a data access request to a data access service, e.g. a SIS or CIS. The enclosing <preHandler> tag defines modifications to requests to a data access service. Replacing or supplementing this tag, e.g. with <postHandler>, can be used to define modifications to request responses from the data access service, e.g. modifications to the PlacementResponse message (see FIG. 10; also refer to the specification document ANSI/SCTE 130-3 2010, Digital Program Insertion-Advertising Systems Interfaces Part 3 Ad Management Service (ADM) Interface).

Figure 9:
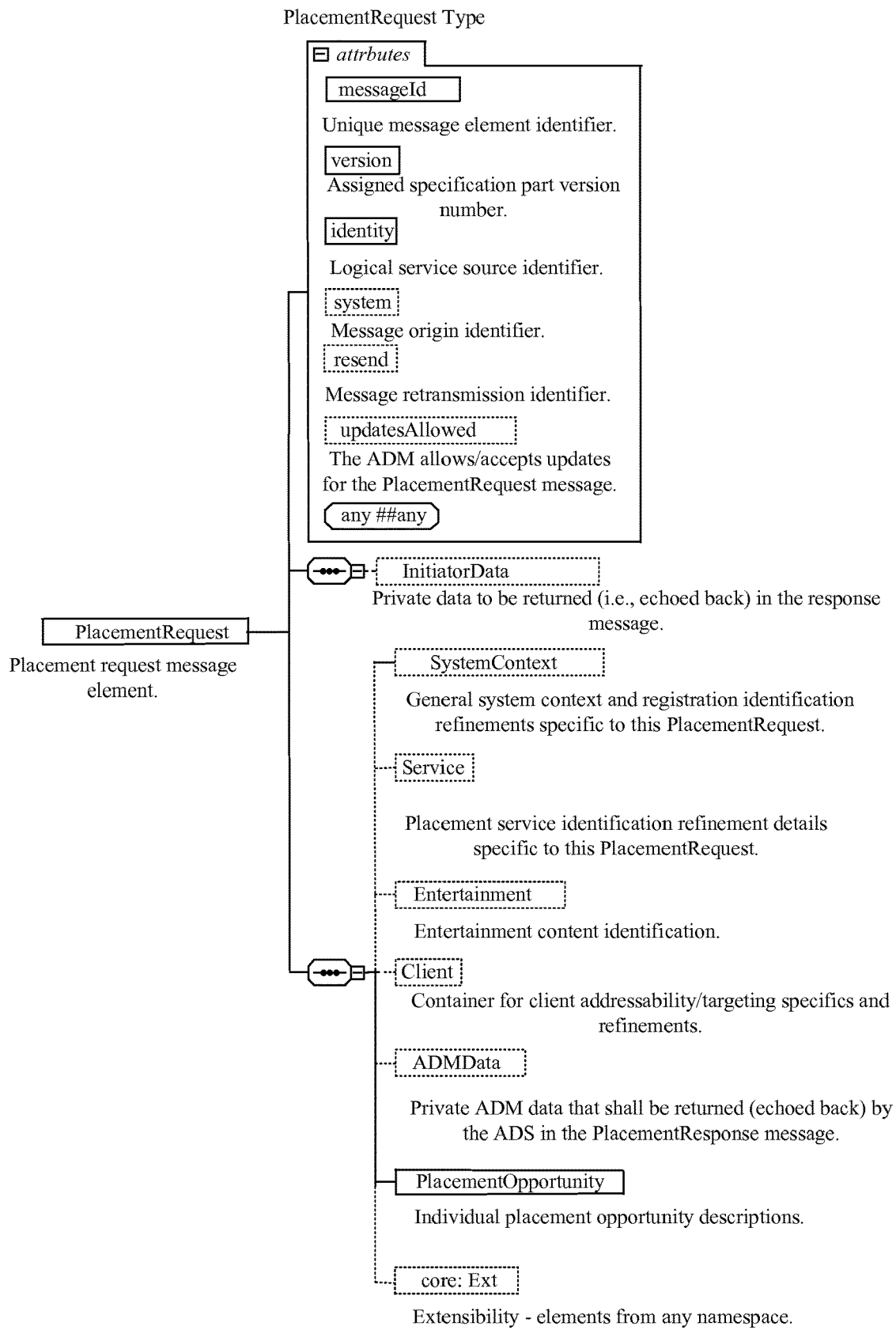
FIG. 9 illustrates an SCTE-130-3 PlacementRequest message that may invoke the data policy enforcement component.

The example handler operates on messages directed to a specific ADS component, and modifies the "Target Code" element in a PlacementRequest message (see FIG. 9; also refer to the specification document ANSI/SCTE 130-3 2010, Digital Program Insertion-Advertising Systems Interfaces Part 3 Ad Management Service (ADM) Interface), which is one place ad targeting information is conveyed between components in an advanced digital advertising system.

The data organization of Listing 1 defines four operations. Each operation is defined in a distinct section of the data organization.

The section "add-target-codes-handler" specifies that target codes "msoCustomer=true" and "country=usa" should be added to all PlacementRequests directed to the specific ADS. The particular ADS may expect to receive a particular value, such as a platform type.

The section "regex-target-codes-handler" applies regular expressions to existing Target Codes in the PlacementRequest. The example retains TargetCodes where the Key is "age" and the value is any set of two digits, 0-9. Other ages will be removed.

The section "remove-target-codes-handler" will result in removal of any Target Codes with the keys "macAddress" or "income" from the PlacementRequest to the particular ADS. This enforces a policy restriction preventing a third party from using certain targeting types. In practice there could be many more such restrictions put in place by this section.

The section "replace-target-codes-handler" causes Target Code values to be transformed from one string to another. The example replaces "25 k" with "25000" and "Baseball" with "baseball". This enables the adaptation of naming or taxonomies from one system to another.

Figure 11:
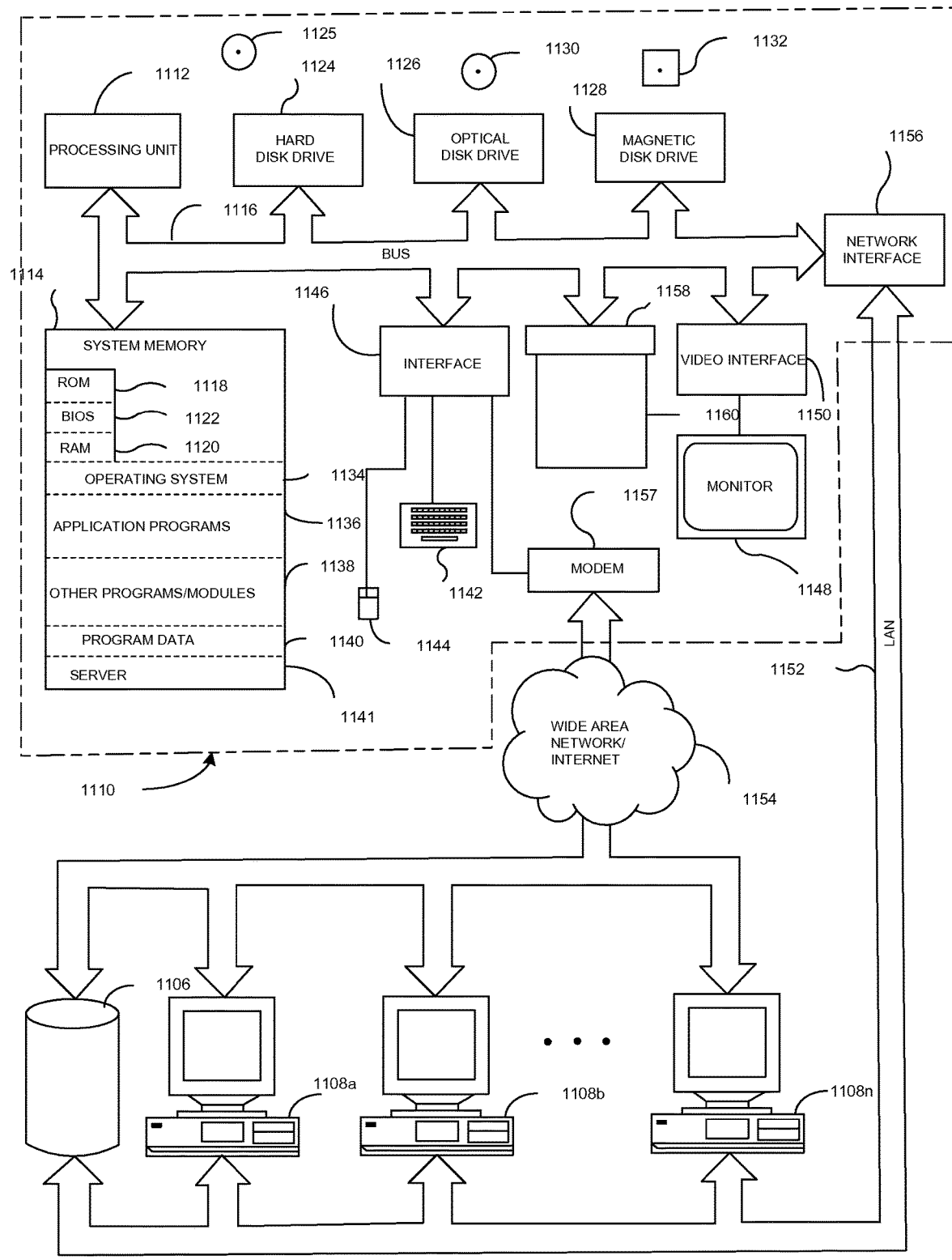
FIG. 11 illustrates a machine system and details of a particular machine to implement an advanced advertising system.

FIG. 11 illustrates an embodiment of a computer system machine network to implement an advanced advertising system. A particular computer system 1100 of the machine network may include one or more processing units 1112a, 1112b (collectively 1112), a system memory 1114 and a system bus 1116 that couples various system components including the system memory 1114 to the processing units 1112. (One or more such machine could implement the SIS, CIS, ADM, ADS, POIS, or hub components in an advanced advertising system). The processing units 1112 may be any logic processing unit, such as one or more central processing units (CPUs) 1112a, digital signal processors (DSPs) 1112b, application-specific integrated circuits (ASICs), field programmable gate arrays (FPGAs), etc. The system bus 1116 can employ any known bus structures or architectures, including a memory bus with memory controller, a peripheral bus, and a local bus. The system memory 1114 includes read-only memory (ROM) 1118 and random access memory (RAM) 1120. A basic input/output system (BIOS) 1122, which can form part of the ROM 1118, contains basic routines that help transfer information between elements within the computer system 1100, such as during start-up.

The computer system 1100 may also include a plurality of interfaces such as network interface 1160, interface 1150 supporting modem 1162 or any other wireless/wired interfaces.

The computer system 1100 may include a hard disk drive 1124 for reading from and writing to a hard disk 1126, an optical disk drive 1128 for reading from and writing to removable optical disks 1132, and/or a magnetic disk drive 1130 for reading from and writing to magnetic disks 1134. The optical disk 1132 can be a CD-ROM, while the magnetic disk 1134 can be a magnetic floppy disk or diskette. The hard disk drive 1124, optical disk drive 1128 and magnetic disk drive 1130 may communicate with the processing unit 1112 via the system bus 1116. The hard disk drive 1124, optical disk drive 1128 and magnetic disk drive 1130 may include interfaces or controllers (not shown) coupled between such drives and the system bus 1116, as is known by those skilled in the relevant art. The drives 1124, 1128 and 230, and their associated computer-readable storage media 1126, 1132, 1134, may provide non-volatile and non-transitory storage of computer readable instructions, data structures, program modules and other data for the computer system 1100. Although the depicted computer system 1100 is illustrated employing a hard disk 1124, optical disk 1128 and magnetic disk 1130, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1112a.

Program modules can be stored in the system memory 1114, such as an operating system 1136, one or more application programs 1138, other programs or modules 1140 and program data 1142. Application programs 1138 may include instructions that cause the processor(s) 1112 to automatically provide dynamic selection of data and telecommunication service providers before or during communications between various devices such as, for example, a mobile device and a landline telephone. Other program modules 1140 may include instructions for handling security such as password or other access protection and communications encryption. The system memory 1114 may also include communications programs, for example, a Web client or browser 1144 for permitting the computer system 1100 to access and exchange data with sources such as Web sites of the Internet, corporate intranets, extranets, or other networks and devices as described herein, as well as other server applications on server computing systems. The browser 1144 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1114, the operating system 1136, application programs 1138, other programs/modules 1140, program data 1142 and browser 1144 can be stored on the hard disk 1126 of the hard disk drive 1124, the optical disk 1132 of the optical disk drive 1128 and/or the magnetic disk 1134 of the magnetic disk drive 1130.

An operator can enter commands and information into the computer system 1100 through input devices such as a touch screen or keyboard 1146 and/or a pointing device such as a mouse 1148, and/or via a graphical user interface. Other input devices can include a microphone, joystick, game pad, tablet, scanner, etc. These and other input devices are connected to one or more of the processing units 1112 through an interface 1150 such as a serial port interface that couples to the system bus 1116, although other interfaces such as a parallel port, a game port or a wireless interface or a universal serial bus (USB) can be used. A monitor 1152 or other display device is coupled to the system bus 1116 via a video interface 254, such as a video adapter. The computer system 1100 can include other output devices, such as speakers, printers, etc.

The computer system 1100 can operate in a networked environment using logical connections to one or more remote computers and/or devices. For example, the computer system 1100 can operate in a networked environment (LAN, WAN) using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 12:
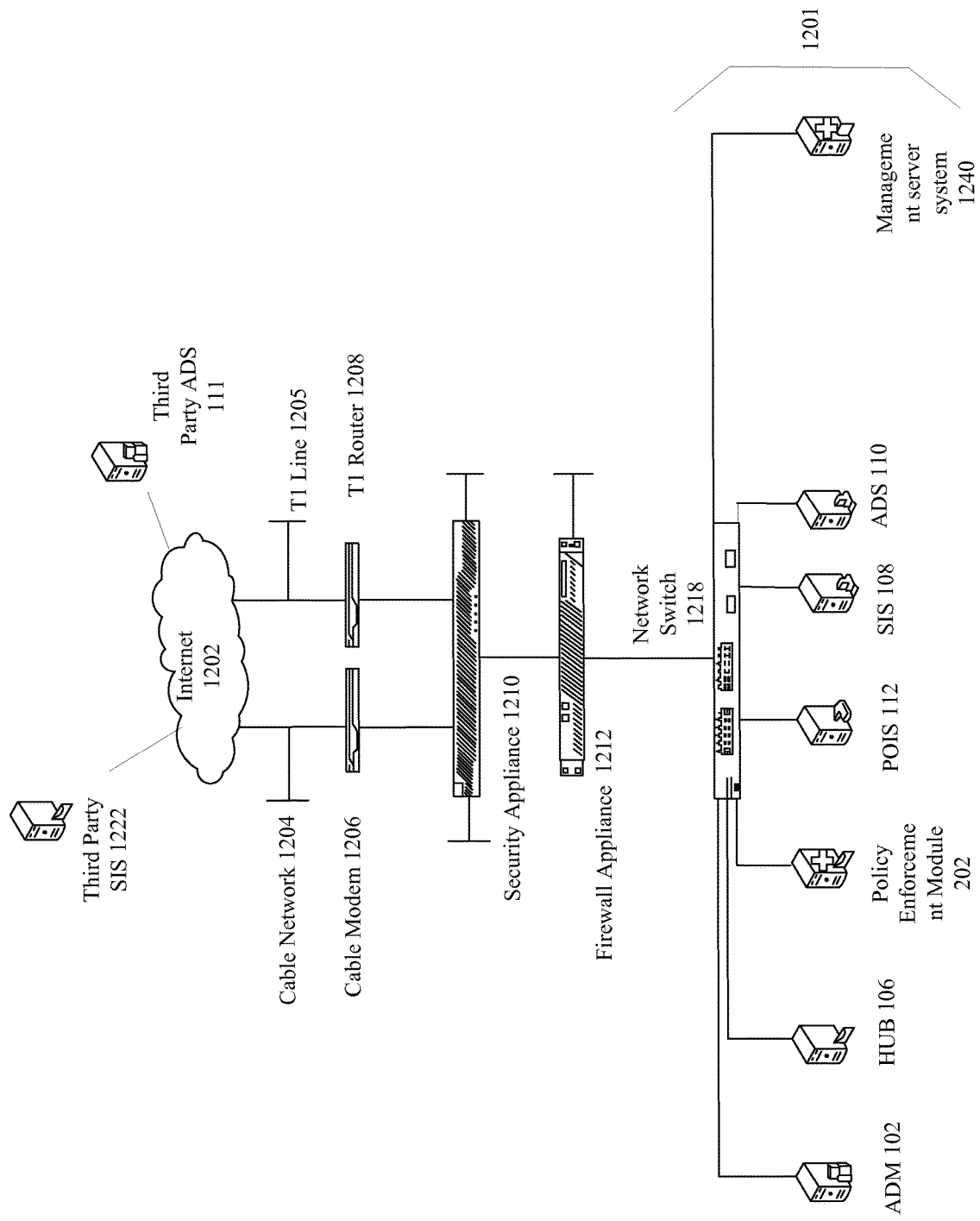
FIG. 12 illustrates a machine network for implementing an advanced advertising system.

FIG. 12 illustrates an embodiment of a machine internetworking system to implement aspects of an advanced advertising system. Communication is carried out between devices of a local area network (LAN) 1201 and a wide area network (WAN) 1202 (e.g., the Internet). The LAN 1201 includes server systems for an ADM 102, hub 106, Policy Enforcement Module 202, POIS 112, SIS 108, and ADS 110. Of course, a typical LAN includes other devices as well, such as printers, faxes, scanners, etc. The networks are bridged over a cable network 1204 and a Ti line 1205 via a system of devices including (in this example) a cable modem 1206, a Ti Router 1208, a security appliance 1210, a firewall appliance 1212, and a network switch 1218. The security appliance 1210 (e.g., Cisco 5510) provides, for example, firewall and VPN (virtual private network) concentration, intrusion detection, and intrusion prevention. The firewall appliance 1212 (e.g., Barracuda) provides, for example, anti-virus and anti-fishing protection for the LAN 1201, and web, email, and file content filtering. Communication traffic is switched between the LAN 1201 and the WAN 1202 by a network switch 1218. Third party SIS 1222 and ADS 111 components can interact with the devices of the LAN 1201 via the internetworking components (1210, 1212, 1208 for example), the cable network 1204 or Ti line 1205, and the WAN 1202.

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Glossary

'DPI' in this context refers to (Digital Program Insertion) technology that enables cable headends and broadcast affiliates to insert locally-generated commercials and short programs into remotely distributed regional programs before they are delivered to home viewers. Digital Program Insertion also refers to a specific technology which allows an MPEG transport stream to be spliced into a currently flowing MPEG transport stream seamlessly and with little or no artifacts. The controlling signaling used to initiate an MPEG is referred to as an SCTE35 message. The communication API between MPEG splicers and Content Delivery Servers or Ad Insertion Servers is referred to as SCTE 30 messages.

'SCTE 130' in this context refers to a specification from the Society of Cable Telecommunication Engineers that defines a set of interfaces between logical components of an advanced advertising system designed to support linear, on demand and DVR delivery platforms, and to enable a more granular level of addressability. The interfaces address various elements of the advertising system including: ad manager, ad decision server, content information service, subscriber information service and placement opportunity information service.

'flash memory' and the like in this context refers to a type of electrically erasable programmable read-only memory (EEPROM), in which a section of memory cells can be erased in a single action or in a "flash." A common use of flash memory is to store device settings that persist across power interruptions. Flash memory is used in digital cameras, cellular phones, networking hardware, and PC cards. Flash memory is non-volatile computer memory that can be electrically erased and reprogrammed. Non-volatile means that no power is needed to maintain the information stored on the chip. It is a technology that is used as solid state storage and a main purpose is an inexpensive way of storing or transferring data between computers and other digital products.

'LAN' in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

'WAN' in this context refers to (Wide Area Network) a network that provides data communications to a larger number of users than are usually served by a local area network (LAN) and is usually spread over a larger geographic area than that of a LAN; logic implementing a network that covers a broad area (e.g., a telecommunications network that links across metropolitan, regional, or national boundaries) using private or public network transports. Business and government entities utilize WANs to relay data among employees, clients, buyers, and suppliers from various geographical locations. The Internet can be considered a WAN.

'ad placement' in this context refers to a decision resulting from an ad placement opportunity which may include a content binding and a set of constraints. Ad content inserted into or along-side program content.

'ADS' in this context refers to (Ad Decision Service) a logic component in SCTE 130 compliant advanced digital advertising systems, that determines how advertising content is combined with non-advertising (entertainment) content assets (i.e., placement decisions). The ADS may communicate with the POIS to acquire placement opportunity information. Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

'ADM' in this context refers to (Ad Decision Manager) a logic component in SCTE 130 compliant advanced digital advertising systems, that originates messages articulating ad insertion opportunities (i.e., placement opportunities) with the primary communication consumer being the ADS (Ad Decision Service). The ADM completes the opportunity/decision lifecycle via reporting activity events (i.e., placement status). The ADM communicates placement opportunities and placement status to the ADS and the ADS returns placement decisions as a response to placement opportunities. An ADM may support multiple, simultaneously active ADS as each ADS may provide different placement decision services. The ADM block may consult the POIS for placement opportunity information with the POIS fronting an ad opportunity scheduling system (inventory system). Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

'CIS' in this context refers to (Content Information Service) a logic component in SCTE 130 compliant advanced digital advertising systems, that provides content asset metadata and availability.

(Content Information Service) a logic component in SCTE 130 compliant advanced digital advertising systems, that provides content asset metadata and availability information for both advertising and non-advertising content.

'POIS' in this context refers to (Placement Opportunity Information Service) a logic component in SCTE 130 compliant advanced digital advertising systems, that supplies placement opportunity descriptions. The ADM, ADS, and/or the POIS may communicate with the SIS in order to obtain relevant subscriber information such as advertising focus refinement parameters and placement opportunity enablement.

'SIS' in this context refers to (Subscriber Information Service) a logic component in SCTE 130 compliant advanced digital advertising systems, that provides relevant subscriber information such as advertising focus refinement parameters.

'subscriber' in this context refers to The ultimate user, i.e., customer, of a communications service. 'access controller' in this context refers to logic that manages access and use of a shared system resource, such as memory, peripherals, a machine memory organization representing data, or a shared communication channel.

'module' in this context is synonymous with 'component' and refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process.

'hard drive' in this context refers to magnetic disks or optical disks, called platters, that record and store information. Because the data is stored magnetically, information recorded to the hard disk remains intact after you turn the device is turned off. This is a distinction between the hard disk and RAM, or memory, which is reset when the device's power is turned off.

'ad opportunity' in this context refers to a time or data interval pre-, post-, or midroll point in relation to rendered digital content, at which a digital advertisement may be rendered.

'program content' in this context refers to content to which advertising is applied. Digital bit streams (e.g., MPEG) encoding television programs or movies are examples of program content. 'ad content' in this context refers to content promoting or raising awareness of a product or service, displayed in conjunction with program content, but which typically is independent of the program content (can be displayed in conjunction with different program content at different times).

'hierarchy' in this context refers to a system or organization of data in which some parts are defined to contain other parts, or to be categories or genuses of other parts.

'tag' in this context refers to a feature defining sections of markup language machine code (e.g., HTML, XML).

'registration' in this context refers to a machine process in which communication is carried out across module boundaries, and in which a first module identifies itself to a second module for purposes of being notified of identified events or system or data changes. 'message' in this context refers to a propagated state change in a machine system; an organized signal conveying structured information.

'message handler' in this context refers to logic configured to respond to messages.

'file' in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name).

'telescoping ad' in this context refers to extended advertising content from a smaller and/or shorter version or representation of ad content to a larger and/or longer version of the ad content. Ad telescoping allows the viewer to immediately obtain more information about a product or service by selecting an interactive option on the advertising message.

'ad insertion' in this context refers to the process of physically inserting ad content into a rendering of program content.

'ad replacement' in this context refers to the process of replacing ad content in program content with superceding (typically, more localized) ad content.

'file section' in this context refers to refers to logic that configures a file into separately identifiable sections for purposes of applying the file in a machine system.

'regular expression' in this context refers to (abbreviated regex or regexp) a sequence of symbols that forms a search pattern, mainly for use in machine pattern matching with strings, or string matching, i.e. "find and replace"-like operations. Each character in a regular expression is either understood to be a metacharacter with its special meaning, or a regular character with its literal meaning. Together, they can be used to identify textual material of a given pattern, or process a number of instances of it that can vary from a precise equality to a very general similarity of the pattern. The pattern sequence itself is an expression that is a statement in a language designed specifically to represent prescribed targets in the most concise and flexible way to direct the automation of text processing of general text files, specific textual forms, or of random input strings.

'ATS' in this context refers to (Advanced Television Services) television services that are provided using alternative technologies (such as digital television). Advanced television services are defined for example in the Advanced Television Systems Committee Standard A/53 (1995) ATSC Digital Television Standard (ATSC DTV Standard)

'CATV' in this context refers to (Cable Television) a distribution system that uses a network of cables to deliver multiple video and audio channels. CATV systems typically have 50 or more video channels.

'DTV' in this context refers to (Digital Television) a process or system that transmits video images through the use of digital transmission. The digital transmission is divided into channels for digital video and audio. These digital channels are usually compressed. Video compression commonly uses one of the motion picture experts group (MPEG) standards to reduce the data transmission rate by a factor of 200:1.

'Digital Video' in this context refers to is a sequence of picture signals (frames) that are represented by binary data (bits) that describe a finite set of color and luminance levels. Sending a digital video picture involves the conversion of a scanned image to digital information that is transferred to a digital video receiver. The digital information contains characteristics of the video signal and the position of the image (bit location) that will be displayed.

'ITV' in this context refers to (Internet TV) a television service that is provided through the Internet. 'IP Video' in this context refers to (Internet Protocol Video) the transfer of video information in IP packet data format.

'IPTV' in this context refers to (Internet Protocol Television) the process of providing television (video and/or audio) services through the use Internet protocol (IP) networks. These IP networks initiate, process, and receive voice or multimedia communications using IP protocol. These IP systems may be public IP systems (e.g. the Internet), private data systems (e.g. LAN based), or a hybrid of public and private systems.

'VOD' in this context refers to (Video On Demand) a service that provides end users to interactively request and receive video services. These video services are from previously stored media (entertainment movies or education videos) or have a live connection (news events in real time). 'Video Streaming' in this context refers to delivering video, usually along with synchronized accompanying audio, often over the Internet, a LAN, a WAN, or a CATV network. Upon request, a server system will deliver a stream of video and audio (both compressed) to a client. The client will receive the data stream and (after a short buffering delay) decode the video and audio and play them in synchronization to a user.

What is claimed is:

1. A digital advertising system comprising:
   at least one processor;
   at least one memory comprising a policy file comprising a tag hierarchy; and
   a message routing hub to route digital messages between a requesting component and a responding component in the digital advertising system;
   a message handler to receive the digital messages from the routing hub as the digital messages are routed between the requesting component and the responding component; and
   a policy enforcement module comprising logic to read the policy file from the at least one memory and to configure the at least one processor to modify the digital messages according to the content of the policy file, to thus reconfigure the message handler to dynamically control data access between the requesting component and responding component as follows:
   a. on condition that the policy file includes a distinct section on target code addition, configuring the message handler to add first target codes to the messages as specified by the section on target code addition;
   b. on condition that the policy file includes a distinct section on target code removal, configuring the message handler to remove from the messages second target codes specified by the section on target code removal;
   c. on condition that the policy file includes a distinct section on target code replacement, configuring the message handler to replace in the messages target code replacements specified by the section on target code replacement; and
   d. on condition that the policy file includes a distinct section on target code regular expressions, configuring the message handler to apply the regular expressions to target codes in the messages;
   wherein the tag hierarchy controls data access between (1) one or more ad decision system (ADS), ad management system (ADM), or ad placement opportunity information system (POIS) and (2) a subscriber information system (SIS); and
   wherein configuring the message handler conditionally reconfigures the targeting of the messages by the routing hub.

2. The system of claim 1, further comprising:
   a registration interface whereby the routing hub registers with the policy enforcement module to receive notification when the ADM, the ADS, or the POIS components make data access requests to the SIS; and
   the hub configured to utilize messages to and from the policy enforcement module to configure the data handler to modify the data access requests, responses to the data access requests, or both according to the tag hierarchy.

3. The system of claim 1, wherein the policy enforcement module is internal to the routing hub.

4. The system of claim 1, wherein the policy enforcement module is external to the routing hub.

* * * * *